United States Patent
Bettell

(10) Patent No.: US 7,665,693 B2
(45) Date of Patent: Feb. 23, 2010

(54) AIRCRAFT SEAT

(75) Inventor: Ray Bettell, Chamberley (GB)

(73) Assignee: Premium Aircraft Interiors (UK) Limited, Surrey (GB)

( * ) Notice: Subject to any disclaimer, the term of this patent is extended or adjusted under 35 U.S.C. 154(b) by 239 days.

(21) Appl. No.: 11/661,613

(22) PCT Filed: Aug. 22, 2005

(86) PCT No.: PCT/GB2005/003266

§ 371 (c)(1),
(2), (4) Date: Feb. 27, 2007

(87) PCT Pub. No.: WO2006/021766

PCT Pub. Date: Mar. 2, 2006

(65) Prior Publication Data

US 2008/0093502 A1   Apr. 24, 2008

(30) Foreign Application Priority Data

Aug. 27, 2004   (GB) ................................. 0419148.2

(51) Int. Cl.
*B64D 11/06* (2006.01)
(52) U.S. Cl. ............................... 244/122 R; 244/118.5; 297/61
(58) Field of Classification Search .............. 244/118.5; 297/61

See application file for complete search history.

(56) References Cited

U.S. PATENT DOCUMENTS

| | | | | |
|---|---|---|---|---|
| 3,057,657 A * | 10/1962 | Fletcher | ........................ | 297/61 |
| 3,667,075 A * | 6/1972 | Ballard et al. | ................... | 5/722 |
| 3,958,827 A * | 5/1976 | Re | ............................... | 297/61 |
| 5,222,784 A * | 6/1993 | Hamelin | ...................... | 297/408 |
| 5,740,989 A * | 4/1998 | Daines | ..................... | 244/118.6 |
| 5,857,745 A * | 1/1999 | Matsumiya | ............ | 297/354.13 |
| 5,992,798 A * | 11/1999 | Ferry | ....................... | 244/118.6 |
| 6,056,239 A * | 5/2000 | Cantu et al. | ............... | 244/118.6 |
| 6,059,364 A * | 5/2000 | Dryburgh et al. | ....... | 297/354.13 |
| 6,170,786 B1 * | 1/2001 | Park et al. | ................. | 248/274.1 |
| D439,063 S * | 3/2001 | Round et al. | .................. | D6/356 |
| 6,209,956 B1 * | 4/2001 | Dryburgh et al. | ............ | 297/245 |
| 6,227,489 B1 * | 5/2001 | Kitamoto et al. | .......... | 244/118.5 |

(Continued)

*Primary Examiner*—Michael R Mansen
*Assistant Examiner*—Justin Benedik
(74) *Attorney, Agent, or Firm*—Jennifer Meredith; Fariba Sirjani; Meredith & Keyhani, PLLC

(57) ABSTRACT

An aircraft seat, which is convertible into a bed, is divided from adjacent seats by partitions 2 and has a movable squab 11, a movable leg rest 12, a fixed foot rest 14 and a movable backrest 15 to which a headrest 17 is pivotally connected. A control panel 21 is provided on a partition 2 for controlling the disposition of the seat. The seat has front legs 29 and rear legs 28 pivoted to aircraft deck 27 and is actuated by slide actuator 29 and recline actuator 30 (which extends or retracts rear legs 28).

In the normally sitting up position of the seat, the squab back is held towards cabin wall 48 with a slide actuator 29 and a recline actuator 30 extended. When the seat is partially reclined the headrest 17 is pivoted forward to lie at an obtuse angle with respect to the front face of backrest 15 to keep headrest 17 clear of cabin wall 48. In the fully reclined position of the seat, the headrest 17 is lowered into recess 51 in shelving 52 at the rear of the seat unit along cabin wall 48.

18 Claims, 6 Drawing Sheets

U.S. PATENT DOCUMENTS

| | | | |
|---|---|---|---|
| 6,305,644 B1 * | 10/2001 | Beroth | 244/118.5 |
| 6,352,309 B1 * | 3/2002 | Beroth | 297/354.13 |
| 6,494,536 B2 * | 12/2002 | Plant | 297/284.11 |
| 6,692,069 B2 * | 2/2004 | Beroth et al. | 297/118 |
| 6,742,842 B2 * | 6/2004 | Dowty | 297/354.13 |
| 2001/0015566 A1 * | 8/2001 | Park et al. | 297/115 |
| 2003/0085597 A1 * | 5/2003 | Ludeke et al. | 297/184.14 |
| 2003/0218095 A1 * | 11/2003 | Saint Jalmes | 244/118.5 |

* cited by examiner

AIRCRAFT SEAT

The present invention relates to an aircraft seat, in particular one convertible to a bed.

Convertible seats are well known. There is, however, a difficulty in arranging a maximum number of such seats in an aircraft cabin, in that they are not readily configured in lines abreast as regards access. A staggered or herringbone arrangement is preferred in terms of privacy and efficient arrangement of the seats in a cabin.

An awkwardness of a herringbone arrangement of essentially rectangular seats along the edge of a cabin is that at one end—the head end in practice—a triangular area exists against the cabin wall beyond the end of the seat.

In International Patent Application No WO 03/013903, in the name of Virgin Atlantic Airways Limited, there is a proposal to utilise the triangular area to extend the length of the bed surface (page 29, lines 13-15). This seat is configured such that the seat backrest folds forwards for conversion to a bed, with the bed surface being formed by the backrest of the seat backrest and other surfaces (FIG. 5).

The object of the present invention is to utilise the triangular area by accommodating part of the reclined seat forming the bed surface in the triangle.

A difficulty with this concept as taught by Virgin is that use of the triangular surface per se as part of the bed surface moves the entire reclining seat further from the cabin wall, since the seat backrest and the head rest must be of a certain length to accommodate tall passengers and the head rest must finish on the side of the triangular space remote from the cabin wall.

An alternative which we have adopted in the present invention is to lower the head rest into the triangular area. This makes for more efficient use of the space, but creates another problem in that the cabin wall is not vertical but curves inwards over the triangle. Lowering a full length seat backrest and head rest into the triangular space to make most efficient use of the space risks fouling of the top edge of the head rest with the cabin wall.

To overcome this problem, we propose the improvement of foreshortening the seat backrest and headrest combination during lowering into the triangular space.

According to the invention, we provide an aircraft seat convertible to a bed which comprises:

a seat having:
  a squab and a backrest, both being movable;
  a mechanism for moving the movable squab and backrest between respective dispositions in the seat's upright, sitting configuration and its laid-down, bed configuration; and
  a headrest with a front face normally substantially aligned with a front face of the backrest and an end which is at the top of the headrest when the seat is in its sitting configuration;

wherein the convertible seat is improved by including:
  drive means for moving the headrest to foreshorten the combined length of the backrest and the headrest, for movement of the backrest between its dispositions for the sitting configuration and the bed configuration, and to extend the shortened length when the backrest is moved to its disposition for either of these configurations.

With the seat in bed configuration, the improvement allows the top of the headrest to be the head end of the bed and adjacent the cabin wall, i.e. in the area referred to above as the triangle, with the cabin wall being in the position of a bed head, albeit at an acute angle to the length of the bed. This is possible despite the cabin wall overhanging the head rest, since as the backrest is lowered, the top of the headrest is moved away from the cabin wall towards the seat squab.

It is envisaged that the drive means may manual, it is preferably power operated.

Whilst it can be envisaged that the squab movement mechanism can be a linkage mechanism, in which a single actuator moves all parts of the seat in phase with each other between the different configurations of the seat, in the preferred embodiment, the mechanism includes a plurality of actuators under control of a control system programmed to synchronise the actuators.

The headrest can be arranged to move translationally towards the seat squab general parallel to the backrest to achieve the foreshortening of the backrest and the headrest. However in the preferred embodiment, the headrest is pivotally arranged on the backrest for foreshortening movement by angling of the headrest such that the front faces of the headrest and the backrest form an obtuse angle, the control system being programmed to achieve this obtuse angle during lowering of the backrest from the sitting configuration to bed configuration.

In the preferred embodiment, the headrest is pivotally connected to the backrest at a pivot axis therebetween, close to the front of faces of these. Alternatively the headrest may be connected to the backrest by legs which can be telescopically withdrawn (e.g. into tubes in the frame of the backrest) to bring the headrest closer to the backrest and thereby to foreshorten the combined length of the backrest and the headrest.

It can also be envisaged that the squab movement mechanism and the control system can be an integrated mechanism with a single actuator lowering both the seat backrest and inclining the headrest forwards during such lowering, with the control system being a simple up/down control. However, in the preferred embodiment, separate actuators are provided for the backrest and the headrest, typically electric motor and gearbox driven lead screw devices, and the control system is an electronic controller. Alternatively, hydraulic pump and ram devices can be used. The backrest actuator (and squab) actuators can be as described in our prior European Patent No 1,074,468 ("Our Earlier European Patent").

Preferably, the controller is programmed to allow the headrest to be raised for watching of television when the seat is fully reclined to bed configuration and adjusted to a convenient angle if the seat is stopped between sitting and bed configuration, with the proviso that it is not angled back to foul the cabin wall.

In a seat unit incorporating a seat of the invention, the unit has a shelf surrounding the headrest in its lowered, bed position, with the shelf being at the same general level as the headrest surface, except that the shelf is recessed adjacent the headrest at least around part of the extent of the head-rest/shelf interface.

Whilst it is envisaged that the headrest may be lowered onto the recessed surface, an anti-entrapment collapsible device will normally be provided between the headrest and the recessed surface. This device can be a bellows device. It can also be envisaged that the recessed surface can be open, to provide access to the void therebelow, but this is awkward to reach and is not preferred.

To help understanding of the invention, a specific embodiment thereof will now be described by way of example and with reference to the accompanying drawings, in which.

Figure 1:
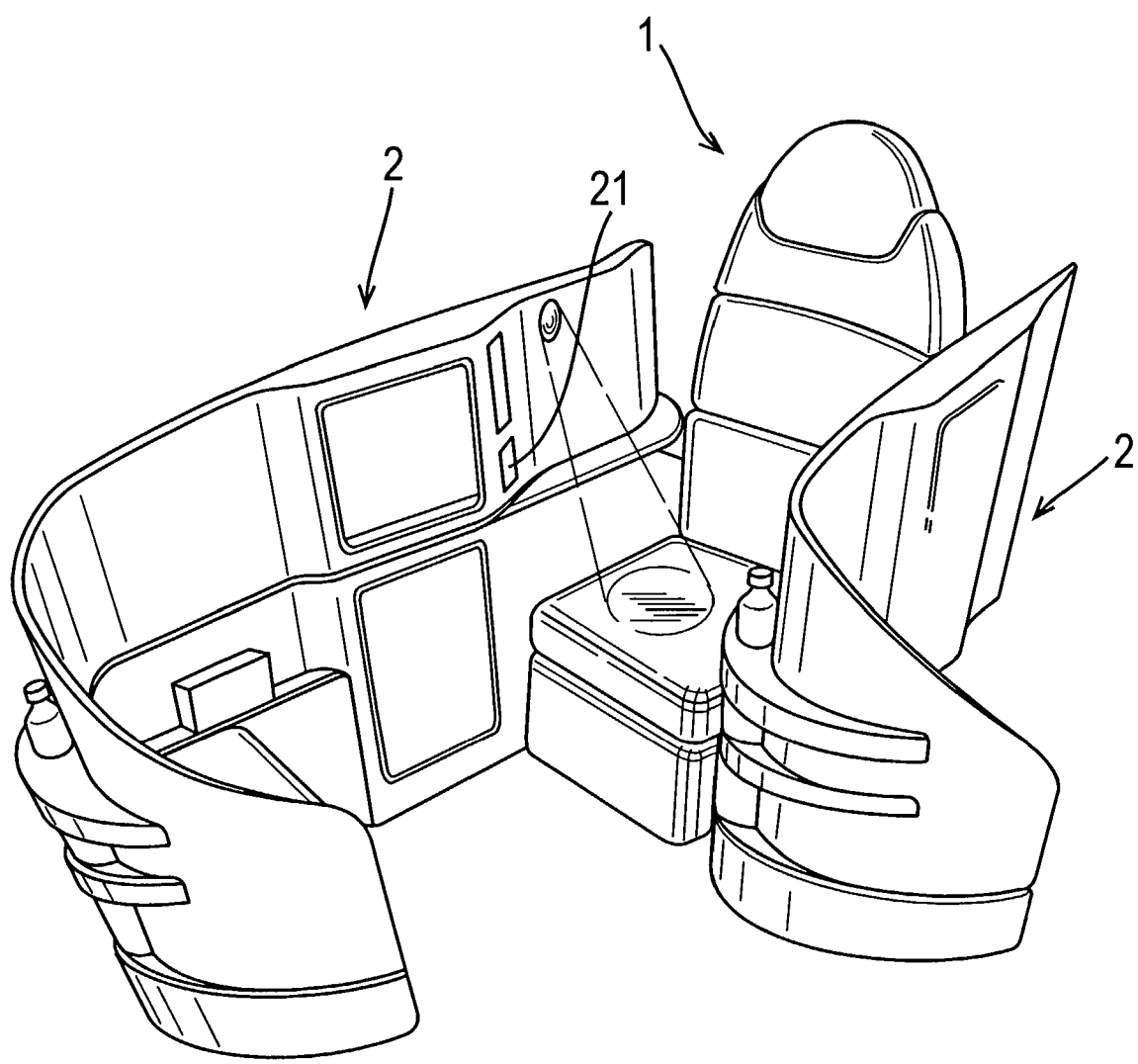
FIG. 1 is a perspective view of a seat unit incorporating convertible bed in accordance with the invention.
Figure 2:
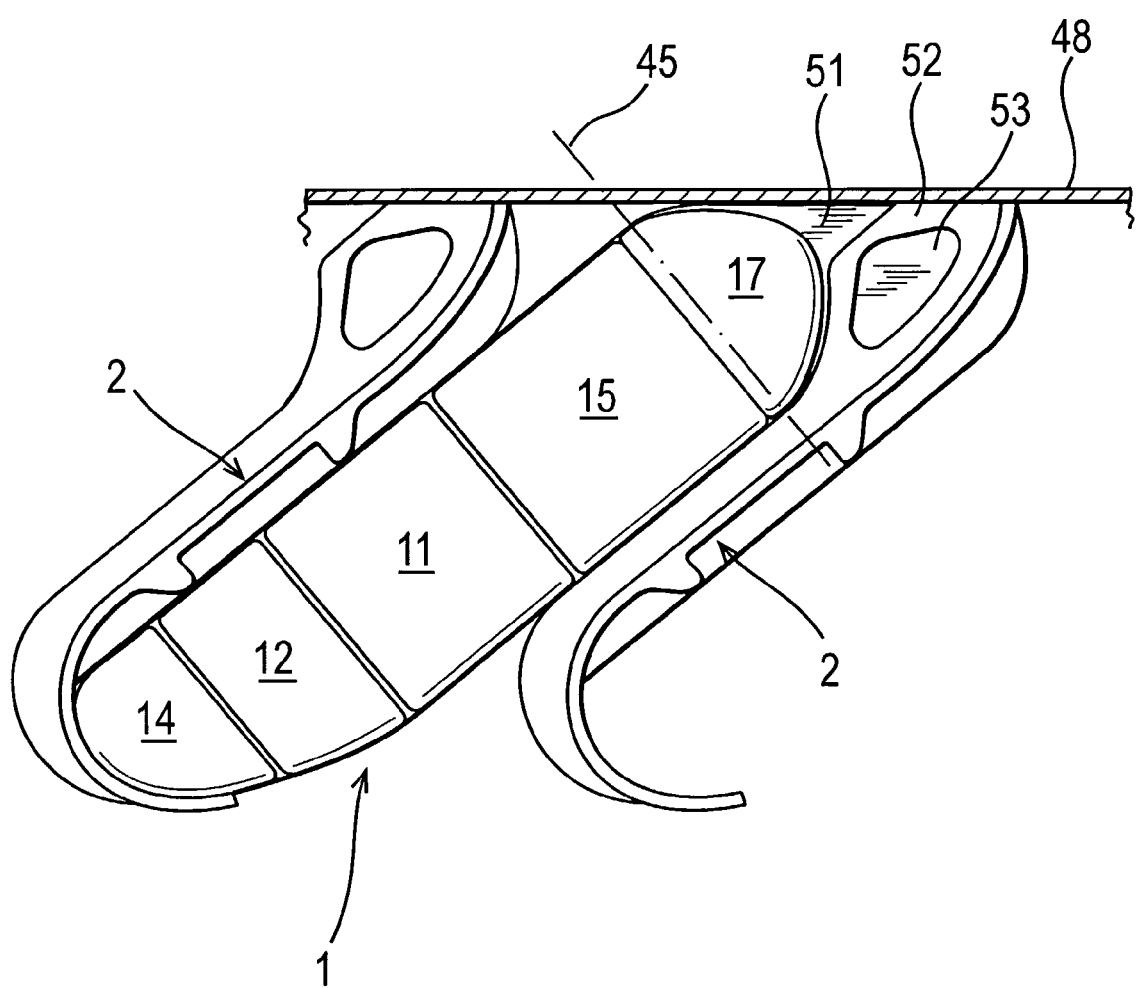
FIG. 2 is a plan view of the seat unit of FIG. 1.

Referring to the drawings, the seat unit there shown has a seat 1 divided from adjacent seats (not shown) by partitions 2, there being equal numbers of seats and partitions in a line of seat units, except that end seats will have special partitions. Therefore a line of n seats has n−1 partitions and two special partitions. This detail is immaterial of the invention and will not be described further.

The seat has a movable squab 11, a movable leg rest 12, and a fixed foot rest 14, which also are conventional. The movable backrest 15 of the seat is conventional, save that it has a headrest 17 pivotally connected to it about a pivot axis between them and close to the front face of the backrest and the headrest. A control panel 21 is provided on the partition 2 for controlling the disposition of the seat.

The seat is supported on:—
runners 22 on a frame 23, incorporated in the partitions, via sliders 24 attached to the underside of the rear of the squab, immediately below a pivotal connection 25 of the backrest and the seat squab;

front legs 26 pivoted to the aircraft deck 27 and the underside of the front of the squab; and rear legs 28 pivoted to the deck and the back of the backrest some 20% up its height.

The seat is actuated by a slide actuator 29 acting between the frame 23 and the front legs 26 and recline actuator 30 acting to extend or retract the rear legs. A further actuator (not shown) extends or retracts the foot rest. The arrangement of the runners, legs and actuators is as in Our Earlier European Patent.

Figure 5:
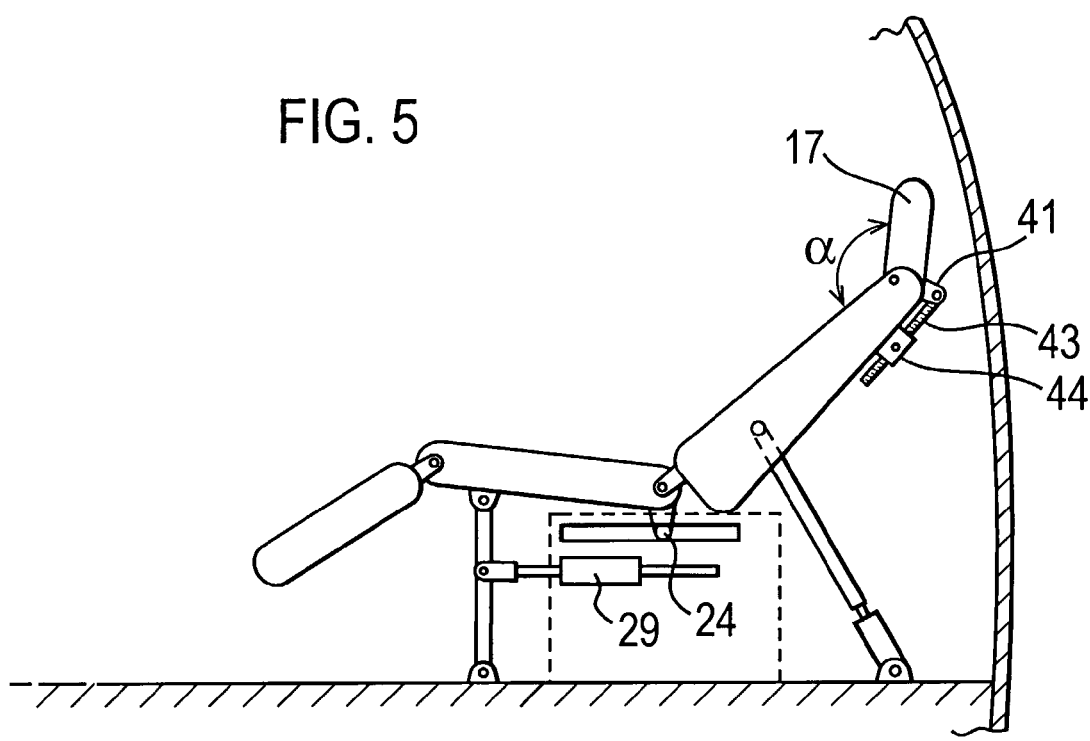
FIG. 5 is a side view of the seat in a further reclined position.

The pivoted head rest 17 is provided with a 41 rear crank pivotally connected to a lead screw 43 from an actuator 44 for rotating a non-shown screw nut. The arrangement is such that the headrest can be pivoted about an axis 45 to lie at an obtuse angle α (see FIG. 5) with respect to the front face of the backrest or generally parallel therewith. The back of the headrest is provided with a collapsible bellows 46 and a movable back plate 47, normally urged away from the headrest by internal pressure or resilience, these components being shown in FIGS. 7 & 8 only.

Figure 3:
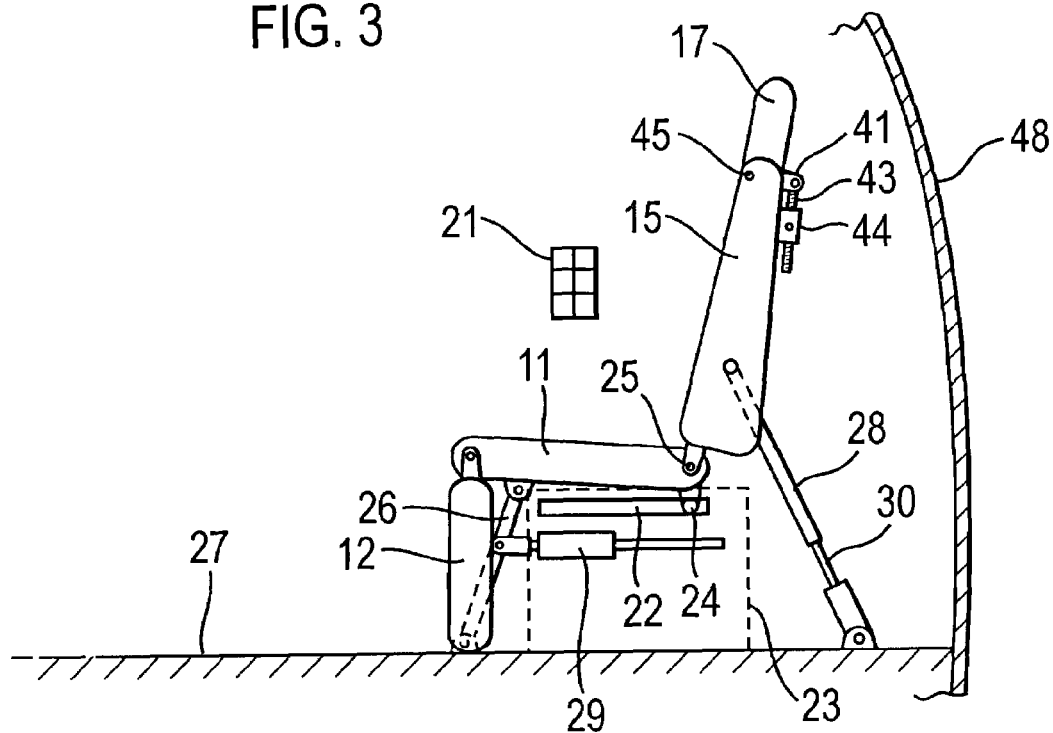
FIG. 3 is a side view of the seat in FIG. 1 in its normal sitting position.
Figure 4:
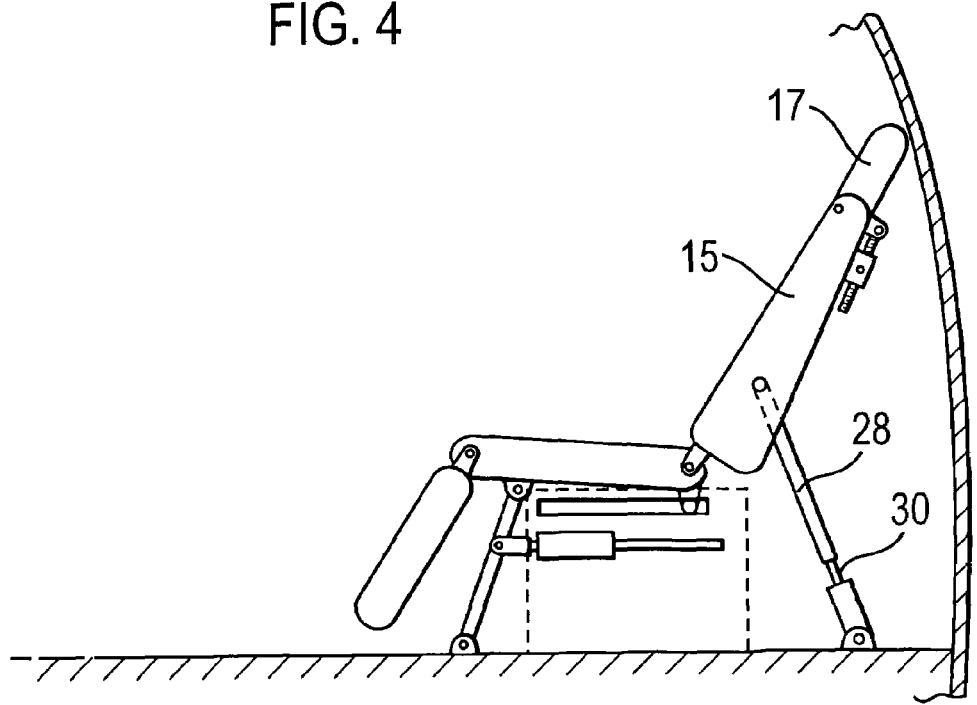
FIG. 4 is a side view of the seat in a partially reclined position.
Figure 6:
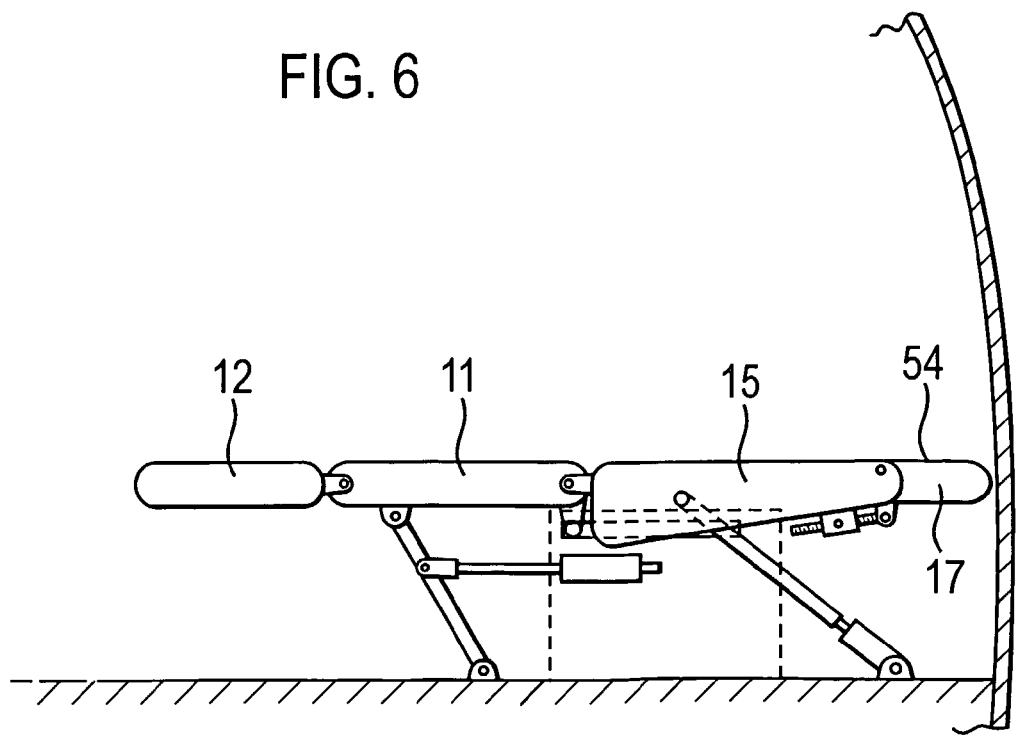
FIG. 6 is a side view of the seat in a fully reclined, bed position.

FIG. 3 shows the normally sitting up position of the seat, in which the slide actuator 29 holds the squab back towards the cabin wall 48 and the recline actuators 30 are extended. FIG. 4 shows the seat slightly reclined with the slide actuator 29 unadjusted and the rear legs 28 shortened by the recline actuators. As will be seen in FIG. 4, further reclining of the seat, which is for rest only, is possible only with either sliding movement of the squab away from the cabin wall or forwards tilting of the head rest. In practice, both are required. A controller incorporated behind the control panel 29 co-ordinates the actuators whereby as the seat is reclined through the position shown in FIG. 5, the head rest is kept clear of the cabin wall. The fully reclined position is shown in FIG. 6.

As fully reclined, the head rest is lowered into a recess 51 in shelving 52 at the rear of the seat unit along the cabin wall, this shelving—including a trinket tray 53—is set at the level of the reclined top surface 54 of the headrest and the backrest. The recess has a surface 55 just below the level of the back of the headrest, when fully lowered. In this position, the bellows 46 and back plate 47 are compressed between the headrest and the recess surface 55.

Figure 7:
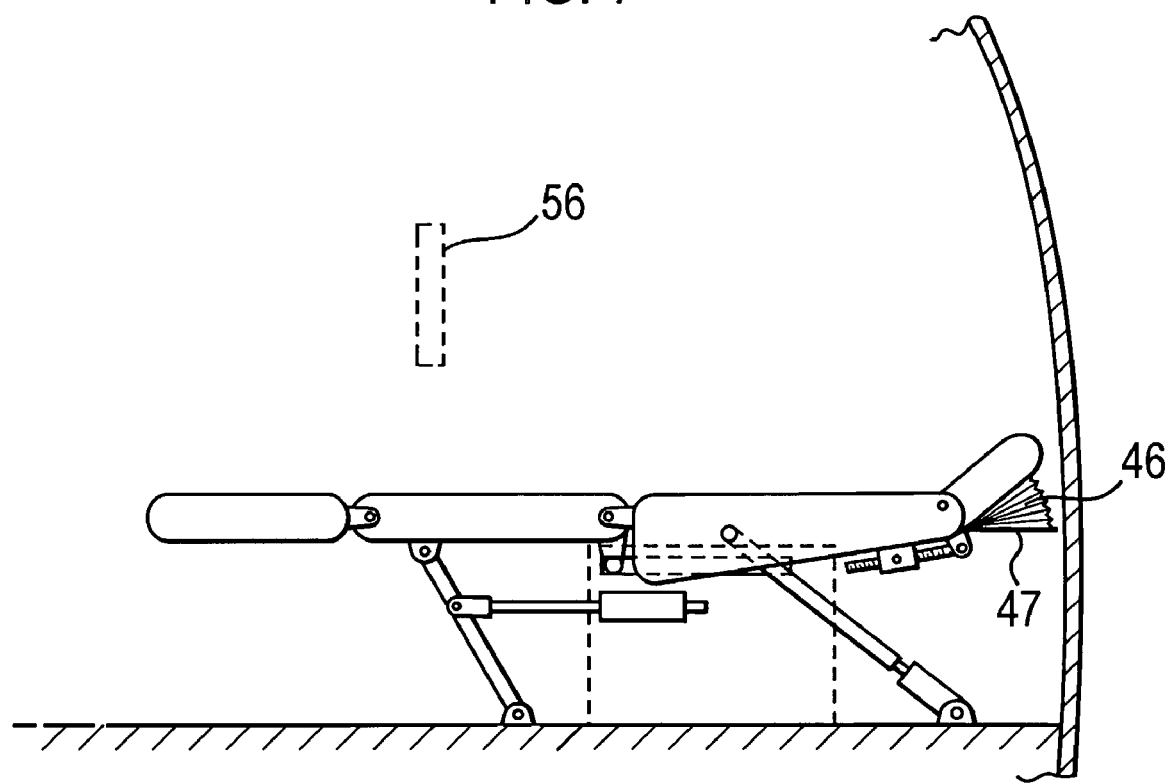
FIG. 7 is a side view of the seat in the bed position with headrest raised.
Figure 8:
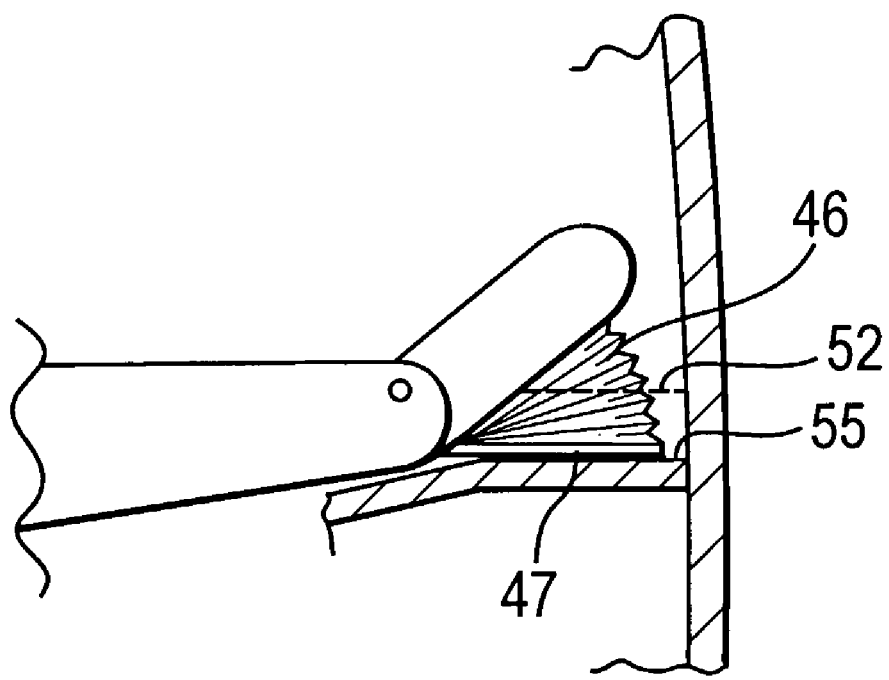
FIG. 8 is a scrap side view on a larger scale of the head rest in its FIG. 7 position.

Should the passenger lying on the reclined seat—now a bed—wish to watch a film, he can withdraw a screen 56 from the partition 2 and control the head rest to be raised to the FIG. 7 position. The bellows then occupies the space between the head rest that the shelf, preventing the passenger from trapping his fingers behind the head rest, should he have them close there when lowering the head rest again for sleep.

Raising of the seat again, is the reverse operation of reclining.

As will be appreciated, arranging the head rest close to the cabin wall, there being no part of the shelf 52 between the reclined head rest and the cabin wall, allows the seat units to be set as close to the cabin walls as possible with the width of the adjacent gangway being maximised. Equally it allows a longer bed for a given extension of the seat from the cabin wall and a given width of gangway.

Figure 9:
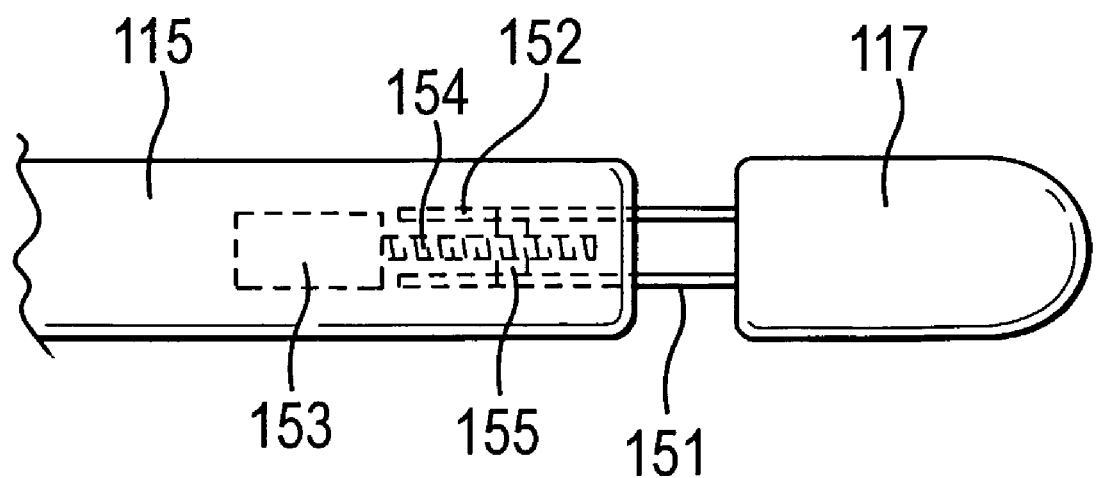
FIG. 9 is a similar scrap side view of an alternative telescopic headrest.

Turning to FIG. 9, the alternative there shown is of a telescopically arranged headrest 117 on a backrest 115 similar the back rest 15. The headrest has a pair of legs 151 telescopically received in tubes 152 incorporated in the frame (not shown) of the backrest. A motor and reduction gear device 153 is also mounted in the backrest, with a lead screw 154 extending into a nut 155 fast with the bottom of one of the legs 151. The arrangement allows the controller to withdraw the head rest towards the backrest in the position equivalent to FIG. 5 and enable the backrest to be moved between the sitting and bed configurations without fouling the cabin wall.

The invention is not intended to be restricted to the details of the above described embodiment. For instance, the head rest can be manually operated, particularly in the FIG. 9 embodiment by providing a manual lever in place of the motor drive 153.

Further, where as in the embodiment of FIG. 1, the head rest has a rounded top, this can be modified to allow the very top to pivot forwards to give a more conventional appearance, with the top being folded up for use. This envisaged primarily as a matter of appearance as opposed to function.

The invention claimed is:

1. An aircraft seat convertible to a bed which comprises:
   a seat having:
      a squab and a backrest, both being movable;
      a mechanism for moving the movable squab and backrest between respective dispositions in the seat's upright, sitting configuration and a laid-down, bed configuration; and
      a headrest with a front face normally substantially aligned with a front face of the backrest and an end which is at the top of the headrest when the seat is in its sitting configuration;
   wherein the convertible seat is improved by provision of:
      drive means for moving the headrest to foreshorten the combined length of the backrest and the headrest, for movement of the backrest between its dispositions for the sitting configuration and the bed configuration, and to extend the shortened length when the backrest is moved to its disposition for either of these configurations;
      powered means for the drive means and the squab moving mechanism; and at least two actuators, including an actuator for the headrest drive means and for the backrest, as part of the powered mechanism; and a control system programmed to synchronize the actuators, whereby the said combined length is foreshortened during reclining and extended in the fully reclined position of the backrest.

2. An aircraft seat according to claim 1, wherein the mechanism and the control system comprise an integrated mechanism in which separate actuators are provided for the backrest and the headrest and the control system includes an electronic controller.

3. An aircraft seat according to claim 1, wherein the at least one of the two actuators or both actuators is an electric motor and gearbox driven lead screw device.

4. An aircraft seat according to claim 1, wherein the drive means is arranged to move the top of the headrest towards the squab to foreshorten the combined length of the backrest and the headrest.

5. An aircraft seat according to claim 4, wherein the headrest is arranged to move translationally towards the seat squab parallel to the backrest to achieve the foreshortening of the backrest and the headrest.

6. An aircraft seat according to claim 5, including legs connecting the headrest to the backrest, legs being telescopically withdrawn to foreshorten the combined length of the backrest and the headrest.

7. An aircraft seat according to claim 4, wherein the headrest is pivotally arranged on the backrest for foreshortening movement by angling of the headrest such that the front faces of the headrest and the backrest form an obtuse angle, the drive means being arranged to achieve this obtuse angle during lowering of the backrest from the sitting to the bed configuration and back again.

8. An aircraft seat according to claim 7, wherein the headrest is pivotally connected to the backrest at a pivot axis therebetween, close to the front faces of these.

9. An aircraft seat according to claim 7, wherein the control system is programmed to allow the headrest to be raised for watching television when the seat is fully reclined to the bed configuration and adjusted to a convenient angle when the seat is stopped between the sitting and the bed configurations, the headrest being angled away from any aircraft cabin wall.

10. An aircraft seat according to claim 7, wherein the headrest is pivotally connected to the backrest at a pivot axis therebetween, and the control system is programmed to allow the headrest to be raised for watching television when the seat is fully reclined to the bed configuration and adjusted to a convenient angle when the seat is stopped between the sitting and the bed configurations, the headrest being angled away from any aircraft cabin wall.

11. An aircraft seat according to claim 1, when located in an aircraft so that, when in bed configuration, the top of the headrest presents the head end of a bed adapted to be adjacent to a cabin wall of the aircraft which forms a bed head.

12. An aircraft seat unit incorporating a seat according to claim 1, wherein the unit has a shelf surrounding the headrest in its lowered, bed, position, the shelf being at the same level as the headrest surface, except that the shelf is recessed adjacent to the headrest at least around part of the headrest/shelf interface.

13. A unit according to claim 12 wherein an anti-entrapment collapsible device is provided between the headrest and the recessed surface.

14. An aircraft seat unit according to claim 13 when located in an aircraft cabin.

15. An aircraft seat unit according to claim 12 when located in an aircraft cabin.

16. An aircraft seat convertible to a bed in combination with an aircraft fuselage, the aircraft seat comprising:

a seat having:
　a squab and a backrest, both being movable;
　a mechanism for moving the movable squab and backrest between respective dispositions in the seat's upright, sitting configuration and its laid-down, bed configuration; and
　a headrest with a front face normally substantially aligned with a front face of the backrest and an end which is at the top of the headrest when the seat is in its sitting configuration;
wherein the convertible seat is improved by including:
　drive means for moving the headrest to foreshorten the combined length of the backrest and the headrest, for movement of the backrest between its dispositions for the sitting configuration and the bed configuration, and to extend the shortened length when the backrest is moved to its disposition for either of these configurations; and
at least two actuators, including an actuator for the headrest drive means and for the backrest, as part of the mechanism; and a control system programmed to synchronize the actuators,
whereby the said combined length is foreshortened during reclining and extended in the fully reclined position of the backrest
the aircraft seat being installed in the fuselage in such position that the backrest cannot be moved from its sitting configuration to its laid-down configuration, due to fouling of the head rest with a cabin wall of the fuselage, without the headrest being moved to foreshorten the combined length of the backrest and the headrest.

17. An aircraft seat according to claim 16, wherein the drive means is manually operated.

18. An aircraft seat according to claim 16, wherein the drive means and the squab moving mechanism are both powered.

* * * * *